United States Patent
Cuijpers

(10) Patent No.: US 6,956,965 B1
(45) Date of Patent: Oct. 18, 2005

(54) COMPRESSING AND DECOMPRESSING AN IMAGE

(75) Inventor: Maurice J. M. Cuijpers, Campbell, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 834 days.

(21) Appl. No.: 09/179,290

(22) Filed: Oct. 27, 1998

(30) Foreign Application Priority Data

Oct. 28, 1997  (EP) .................................. 97203347

(51) Int. Cl.[7] ............................................. G06K 9/00
(52) U.S. Cl. ...................................... 382/164; 382/165
(58) Field of Search ................................ 382/162–167, 382/232–243, 298; 358/515–523

(56) References Cited

U.S. PATENT DOCUMENTS

| | | | | |
|---|---|---|---|---|
| 4,769,632 A | * | 9/1988 | Work et al. ................. | 340/701 |
| 4,825,390 A | * | 4/1989 | Van Aken et al. .......... | 364/526 |
| 5,058,174 A | * | 10/1991 | Carroll ......................... | 382/1 |
| 5,430,465 A | * | 7/1995 | Sabella et al. .............. | 345/199 |
| 5,559,954 A | * | 9/1996 | Sakoda et al. ............... | 395/164 |
| 5,606,632 A | * | 2/1997 | Matsumoto et al. ........ | 382/298 |
| 5,619,591 A | * | 4/1997 | Tsang et al. ................. | 382/166 |
| 5,684,895 A | * | 11/1997 | Harrington .................. | 382/233 |
| 5,748,771 A | * | 5/1998 | Fujiwara ..................... | 382/168 |
| 5,825,917 A | * | 10/1998 | Suzuki ......................... | 382/164 |
| 5,995,653 A | * | 11/1999 | Reed et al. ................. | 382/162 |
| 6,014,466 A | * | 1/2000 | Xia et al. .................... | 382/243 |
| 6,219,445 B1 | * | 4/2001 | Todoroki ..................... | 382/166 |
| 6,259,810 B1 | * | 7/2001 | Gill et al. .................... | 382/166 |

OTHER PUBLICATIONS

G. Campbell, T. Defanti and J. Frederiksen, "ACM Siggraph 86 Conference Proceed.", vol. 20, No. 4 (1986) pp. 215-223.

* cited by examiner

*Primary Examiner*—Andrew W. Johns
*Assistant Examiner*—Amir Alavi
(74) *Attorney, Agent, or Firm*—Dicran Halajian

(57) ABSTRACT

Each pixel in an image has its own color value that is defined in a color look-up table. Regions of the image are separated into groups with similar color values. For each group, the color of one of the pixels is selected. The image is compressed by retaining only references to the color look-up table that define the color values of the pixels selected for the groups and a pixel map which indicates for each pixel, the group to which the pixel belongs among the groups which constitute the region. Upon decompression, each pixel is shown with the color of the pixel that was selected for the group to which the pixel belongs.

11 Claims, 2 Drawing Sheets

COMPRESSING AND DECOMPRESSING AN IMAGE

BACKGROUND OF THE INVENTION

The invention relates to a method of generating image values of an output image as set forth in the precharacterizing part of claim 1. The invention furthermore relates to a device and a computer readable medium containing a program implementing the decompression according to that method.

Such a method is known from an publication by G. Campbell, T. Defanti and J. Frederiksen published in the ACM SIGGRAPH 86 conference proceedings, Vol. 20, no. 4 (1986) pages 215–223. This known method is directed in particular at compression of texture maps for use in computer graphics, where the method is useful because it can perform decompression at real time speeds and is compatible with computer graphics architectures for texture mapping.

The known method is concerned with image compression and decompression. For decompression the output image is divided into a matrix of rectangular regions (typically 4×4 image locations). For each region a set of two color values is defined. For each image location a single bit of information is stored in a pixel map. This bit selects the image value for the image location. If the bit has a first value, say 0, the image value is a first one of the two colors defined for the region to which the image location belongs and if the bit has a second value, say 1, the image value is a second one of these two colors.

For compression the average luminance of the color values from a source image is determined for each region and the image locations in each region are divided into two groups according to whether their luminance in the source image is above the average for the region or not. Image locations with a luminance value above the average for their region are coded for example as 1 in the pixel map, the other image locations are coded as 0. Instead of luminance values other properties of the color can also be used: see for example a publication by G. Knittel, A. Schilling, A. Kugler and W. Straszer, titled "Hardware for superior texture performance" published in Computers and Graphics, vol. 20 No.4 pp 475–481, July–August 1996.

The pair of color values for a region is determined by forming two averages, one from the color values of each group respectively.

This method preserves the average luminance in each region and some of the color value variations. The method requires only 4 bits per image location to store the compressed image in case of 4×4 regions and 24 bit color values.

The publication shows how this number of bits per image location can be reduced further by constructing a color look-up table (CLUT) from the color values used in the various pairs, followed by coding of the pairs of color values by reference to the (CLUT). If a 256 color CLUT is constructed only 2 bits are needed per image location. However, the construction of the color look-up table is time consuming and makes compression slow, moreover it will not in general be clear according to which criteria such a CLUT should best be constructed.

SUMMARY OF THE INVENTION

It is an object of the invention to reduce the amount of time needed to compress the image.

The method according to the invention is characterized by the characterizing part of claim 1. Thus, the original color look-up table provided for the source image is used to represent the colors used for the sets. It has been found that this look-up table also serves well to encode the colors used for different regions in the compressed image. Thus construction of a color look-up table can be avoided.

An embodiment of the method according to the invention is described in claim 2. In this embodiment selection of colors from the look-up table is performed by selecting a representative image location from the set and using its reference to the look-up table. The average of the colors which of the pixels in the set which is used in the prior art will in general not be in the original color look-up table; therefore using the index of a selected color obviates the need to translate the average to the nearest color. Preferably the representative image location is the image location whose luminance is the median luminance among the image locations in a region that belong to the same group. (A median value among a collection of values is defined in statistics as a value whose rank according to size is halfway in the collection). However, acceptable results can also be obtained by taking other image locations, whose rank is not extreme (neither the smallest nor the biggest luminance) or according to a ranking by another property than luminance, e.g. a different weighted average of the color components.

In another embodiment of the method according to the invention the output image is a pyramid of images of increasing resolution. By coding all of the levels of this pyramid with their own regions and pixel maps, all referring a common look-up table a high rate of compression can be realized.

The method according to the invention and its embodiments may be implemented using a suitably programmed computer, or using dedicated circuits. The program may be supplied on a computer readable medium such as a disk (hard disk, floppy disk, CD-ROM etc.) or a PROM memory. The program may be provided e.g. in a DLL (Dynamic Link Library) or COM for a PC.

BRIEF DESCRIPTION OF THE DRAWINGS

These and other objects and advantageous aspects of the method according to invention will be described further using the figures in which.

DESCRIPTION OF THE PREFERRED EMBODIMENTS

Figure 1:
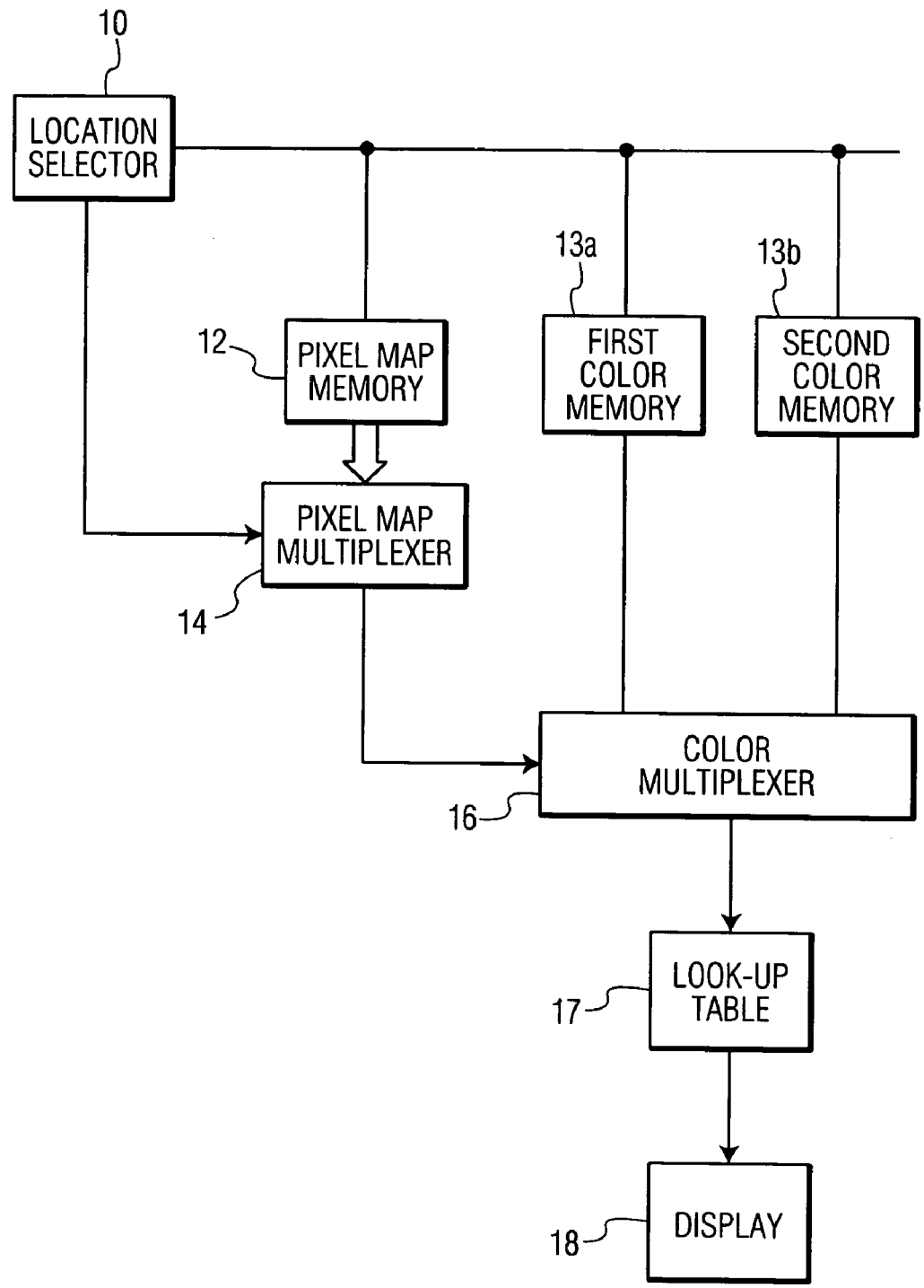
FIG. 1 shows a device for decompressing an image

FIG. 1 shows a device for decompressing an image. The device contains a location selector 10 coupled to address inputs of a pixel map memory 12, a first color index memory 13a and a second color index memory 13b respectively. The pixel map memory 12 is coupled to a pixel map multiplexer 14, which has a control input coupled to the location selector 10. The first and second color index memories 13a, b have outputs coupled to a color index multiplexer 16, which has a control input coupled to an output of the pixel map multiplexer 14. The color index multiplexer 16 has an output coupled to an address input of a color look-up table memory 17, which has an output coupled to a display device 18.

In operation, an image is conceptually divided for example into a matrix of rectangular regions of 4×4 locations. The pixel map memory 12 has a memory location for each region and that location contains one bit for each location in that region, for example 16 bits in total for a 4×4 region. The first and second color index memory 13a,b each have one memory location for every region and those locations each contain an index pointing at a location in the look-up table memory 17. The index is for example 8 bit long and capable of selecting one of 256 colors from the color look-up memory 17. Each location in the color look-up memory contains a color value comprised of for example three 8-bit values for red, green and blue intensities respectively.

The location selector 10 selects a location and outputs an indication of the region to which that location belongs to the pixel map memory 12, and the first and second color index memories 13a,b. In response, the pixel map memory outputs the bits for the locations of the region and the color index memories 13a,b output the indices stored for that region.

The location selector 10 outputs a signal to the pixel map multiplexer 14 to select the bit for the selected location from the bits output from the pixel map memory 12 for the region. The selected bit is supplied to the color index multiplexer, where it selects one of the two color indices output by the color index memories 13a,b. That selected index is supplied to the color look-up table memory where it addresses a color value that in turn is supplied to the display device where the corresponding color is shown in an image.

As a result the displayed image contains a pattern containing only two colors in each region of 4×4 locations. These two colors may differ from region to region. The amount of memory needed to store the image is one bit per image location in the pixel map memory 12, 16 bit per region (that is, an average of 1 bit per image location) in the color index memories 13a,b. Furthermore, 256 24-bit locations are needed for the entire image in the color look-up memory 17.

Of course the device shown in FIG. 1 serves only to illustrate the decompression process. Different devices which execute the same decompression may be used. For example, the various numbers in the preceding are given by way of example only. For example, the various memories 12, 13a,b, 17 need not be separate memories. Furthermore, the numbers used to discuss the decompression are by way of example only. For example, without deviating from the invention, one may use different sized or shaped regions, one may use more than two color indices per region, in which case more color index memories 13a,b will be used and more than one bit will be stored per image location in the pixel map memory 12 (e.g. four color index memories 13a,b and two bits per image location) or one may use a different representation for colors in color look-up memory 17.

Figure 2:
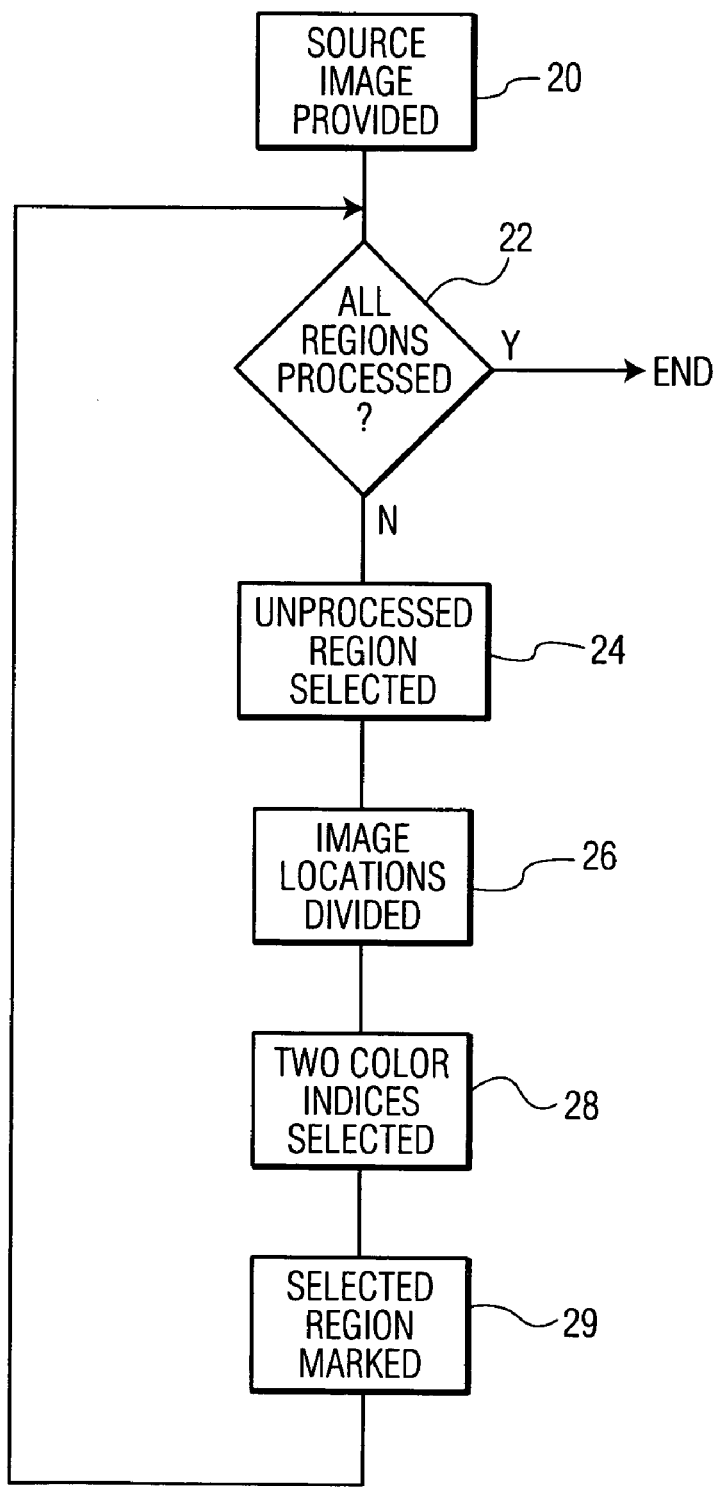
FIG. 2 shows a flow-chart for compressing an image

FIG. 2 shows a flow-chart for compressing an image so that it can de decompressed by a device as illustrated in FIG. 1. In a first step 20 a source image is provided by reference to a color look-up table. That is, for each location in the source image an index is provided that points to a color in the color look-up table. A pixel map with one bit location for each image location is initialized. The source image is divided into a matrix of regions of for example 4×4 image locations. In a second step 22 it is tested whether all regions have been processed. If this is the case, the flow-chart finishes, otherwise a third step 24 is executed.

In the third step 24, an unprocessed region is selected and the average luminance of the color values of the image locations in this region is determined. This may be done by reading the indices for the image locations in the region, fetching the color values pointed at by these indices in the color look-up table, computing the luminance from these color values (the luminance is a well known linear combination of the RGB components of a color value, or a simple approximation like 2*R+4*G+B which requires only a shift operation to implement the multiplications) and summing the luminance's.

In a fourth step 26, the image locations of the selected region are divided into two groups, a first group containing image locations that have a luminance above the average and a second group containing the remaining image locations from the selected region. The pixel map for the source image is updated by marking the image locations of the selected region according to whether the locations belong to one group or the other.

In a fifth step 28, two color indices are selected for the selected region. A first color index is selected by selecting a representative image location from the first group. This representative image location is an image location whose luminance has a median value among the luminance's of the image locations in the first group. A median value in a collection of values is defined in statistics as a value halfway a ranking of the values according to size. So, for example in the collection of values (144, 510, 15, 831, 200) the values can be ranked by size: (15, 144, 200, 510, 831) and the value halfway is 200. In this case, an image location having luminance value 200 would be selected as representative pixel. (in case of an even number of values any one of the pair of values halfway the ranking may be selected). The index which defines the color value of the representative image location in the source image is used as the index into the color look-up table for all image locations in the first group. The index for the second group is selected similarly. Both indices are recorded for the selected region for use during decompression.

In a sixth step 29, the selected region is marked as processed and the flow-chart returns to the second step 22.

Thus the color values used to represent the image locations in a region after decompression correspond to two color values of image locations in the source image before decompression and these color values are represented by indices into the color look-up table used for the source image. The use of the median luminance as a criterion for selecting the representative image location for choosing the two color values has been proven to give good results. However, without deviating from the invention one may also use other rankings, but it is preferable to avoid use of image locations with extreme luminance's (the highest or lowest luminance in the group). This prevents susceptibility to noise and exceptional variations in luminance.

Furthermore, other properties than luminance may be used to rank the values, for example only the red color component or other linear combinations of the color components instead of the luminance. The property and rank used may even be different for different regions. For example, if a region contains less than a predetermined range of luminance values, on may use another linear combination of color components to rank the image locations.

However, if the same criterion is used to select the representative image location in all source images the median of the luminance values has proven to give the best decompression result for most source images.

The device of FIG. 1 and flow-chart of FIG. 2 are preferably used in the context of texture mapping for computer graphics. Computer graphics imaging of a three dimensional world onto a two-dimensional image provides for a coordinate map which relates coordinates of image locations in a displayed image to coordinates of image locations in a texture image. At an image location in the displayed image a color value from the texture image is shown which originates from an image location to which the image location in the displayed image maps. Preferably the texture image is compressed as described hereinabove, and the color value for a given displayed image location is obtained by mapping to a texture image location in the texture image and decompressing the texture image for that texture image location as described.

Textures for computer graphics are often described as mipmaps, that is as a set of subimages which are images of the same texture, but at different levels of detail (also called different levels of (spatial) resolution). These subimages conceptually form a pyramid, each level in this pyramid corresponds to a subimage and from the top of the pyramid downward the subimages have increasing spatial resolution. When the displayed image is generated, it is computed not only from which texture image location the color value must be taken, but also from which level or levels in the pyramid information should be used. This is done to prevent aliasing effects.

Preferably all subimages in the pyramid are compressed and decompressed in the way described hereinabove, all using the same color look-up table. To do so, at each level of the pyramid a subimage is divided into regions (usually the number of image locations per region is the same for all levels, but the distance between the image locations scales with the spatial resolution of the level, so that the extent of the regions becomes smaller as the spatial resolution becomes higher). For all levels the same color look-up table is used and for each region at each level references to that look-up table are selected. For each level a pixel map is constructed.

Upon decompression, the pixel map memory 10 and the color index memories 13a,b store pixel maps and color indices for regions at all levels. The location selector 10 selects not only the image location but also a level in the pyramid (the image location is rounded to obtain a location available at the selected level). The location selector 10 outputs an identification of a region corresponding to that location at the appropriate level and this identification is used to address the pixel map memory 10 and the color index memories 13a,b. This may be repeated for different levels and the decompression results may be combined to obtain an color value for the displayed image. Otherwise decompression does not need to differ from decompression of a single image.

What is claimed is:

1. A method of generating image values of an output image, the method comprising the steps of
   defining a subdivision of the output image into regions of image locations,
   providing a color look-up table,
   providing a respective set of references to the color look-up table for each region,
   providing a pixel map comprising a selection code for each image location,
   selecting a particular reference to the color look-up table for a particular image location from the particular set provided for the region to which the particular image location belongs, by using the selection code as a pointer in that particular set,
   wherein the pixel map is constructed by grouping the image locations in each region into groups according to a similarity of color values in a source image, the selection code identifying the group to which the image location belongs among the groups for the region,
   wherein the color look-up table is provided for the source image, all color values of the source image being in the color look-up table, the reference used for the image locations in a particular group of the pixel map being constructed from at least one reference to the color look-up table which defines the color value in the source image for at least one image location in the particular group,
   wherein the reference used for the image locations in the particular group is constructed by selecting a representative image location from the particular group and taking the reference defining the color value for the representative image location in the source image.

2. A method according to claim 1, wherein the representative image location is selected by determining a image property for each image location in the particular group from the color values in the source image for these image locations in the particular group, and selecting as representative image location an image location for which the image property is median value among the image properties of the image locations in the particular group.

3. A method according to claim 2, wherein the representative image location is an image location which has a median value of the image property among the image properties of the image locations in the particular group.

4. A method according to claim 2, wherein the image property is the luminance of the color value in the source image.

5. A method according to claim 1, wherein the output image represents a pyramid of levels of increasingly higher resolution versions of a basic image, each level being sub-divided into regions, the color look-up table being common for all levels, each level being associated with a respective pixel map, the particular reference to the color look-up table being selected for a particular image location at a particular level, from the particular set provided for the region for that level according to the pixel map for that level.

6. A method according to claim 5, used for texture mapping in computer graphics, wherein the different resolution levels of a mipmap.

7. A method of compressing a source image, the method comprising
   dividing each of a set of regions in the source image into groups of image locations according to a similarity of color values of pixel locations of the group in the source image,
   providing a color look-up table,
   determining a respective reference to the color look-up table for each group,
   forming a compressed image containing an indication of respective groups to which respective pixels belong and the respective references corresponding to the groups,
   wherein the color look-up table is provided for the source image, all color values of the source image being in the color look-up table, the reference used for the image locations in a particular group of a pixel map being constructed from at least one reference to the color look-up table which defines the color value in the source image for at least one image location in the particular group.

8. A machine readable medium comprising a program for compressing a source image, the program comprising
   dividing each of a set of regions in the source image into groups of image locations according to a similarity of color values of pixel locations of the group in the source image,
   providing a color look-up table, determining a respective reference to the color look-up table for each group, forming a compressed image containing an indication of respective groups to which respective pixels belong and the respective references corresponding to the groups, wherein the color look-up table is provided for the source image, all color values of the source image being in the color look-up table, the reference used for the image locations in a particular group of a pixel map being constructed from at least one reference to the color look-up table which defines the color value in the source image for at least one image location in the particular group.

9. A device for compressing a source image, the device comprising means for dividing each of a set of regions in the source image into groups of image locations according to a similarity of color values of pixel locations of the group in the source image, means for providing a color look-up table, means for determining a respective reference to the color look-up table for each group, means for forming a compressed image containing an indication of respective groups to which respective pixels belong and the respective references corresponding to the groups, wherein the color look-up table is provided for the source image, all color values of the source image being in the color look-up table, the reference used for the image locations in a particular group of a pixel map being constructed from at least one reference to the color look-up table which defines the color value in the source image for at least one image location in the particular group.

10. A device as claimed in claim 9, wherein the reference used for the image locations in the particular group is constructed by selecting a representative image location from the particular group and taking the reference defining the color value for the representative image location in the source image.

11. A device as claimed in claim 10, wherein the representative image location is selected by determining a image property for each image location in the particular group from the color values in the source image for these image locations in the particular group, and selecting as representative image location an image location for which the image property is a median value among the image properties of the image locations in the particular group.

* * * * *